(12) United States Patent
Oki

(10) Patent No.: US 7,594,767 B2
(45) Date of Patent: Sep. 29, 2009

(54) PLUGGABLE OPTICAL TRANSCEIVER CLOSELY SET WITHIN A JOINED CAGE

(75) Inventor: Kazushige Oki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 12/341,616

(22) Filed: Dec. 22, 2008

(65) Prior Publication Data

US 2009/0169157 A1    Jul. 2, 2009

(30) Foreign Application Priority Data

Dec. 28, 2007    (JP) .............................. 2007-338746

(51) Int. Cl.
    *G02B 6/36* (2006.01)
(52) U.S. Cl. ............................. 385/92; 385/88; 439/607
(58) Field of Classification Search .................. 385/88, 385/92, 94; 439/607.01; 455/90.3
    See application file for complete search history.

(56) References Cited

U.S. PATENT DOCUMENTS 6,335,869 B1    1/2002    Branch et al.
6,659,655 B2 *  12/2003   Dair et al. ..................... 385/92
6,724,641 B1    4/2004    Hwang
6,824,429 B2    11/2004   Hwang

FOREIGN PATENT DOCUMENTS

JP    2007-233261 A    9/2007

\* cited by examiner

*Primary Examiner*—Frank G Font
*Assistant Examiner*—Michael P Mooney
(74) *Attorney, Agent, or Firm*—Venable LLP; Michael A. Sartori

(57) ABSTRACT

A configuration of the ground finger provided in the pluggable transceiver is disclosed, which makes the gap between the transceivers ideally small even when a plural transceiver is set in side-by-side arrangement within a single cage. The transceiver has side fingers in both side walls thereof, whose levels are different from each other such that, when these transceivers are set in side-by-side arrangement within the single cage, they come in contact with sides of the next transceiver so as not to interfere the contact.

7 Claims, 7 Drawing Sheets

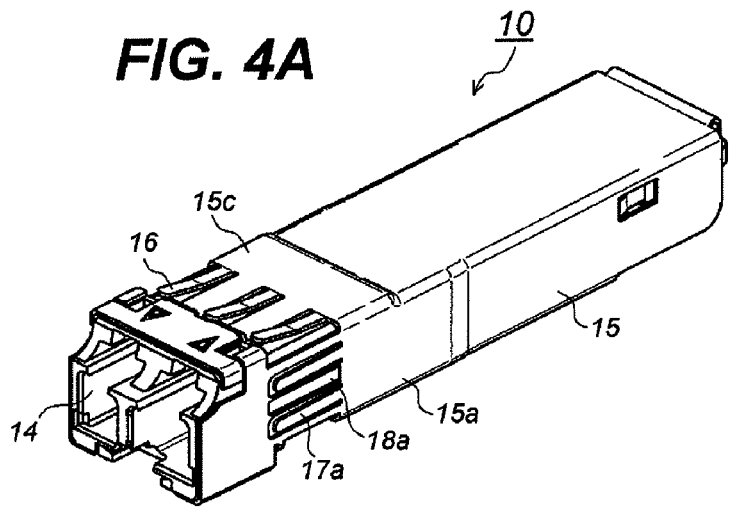
FIG. 4A
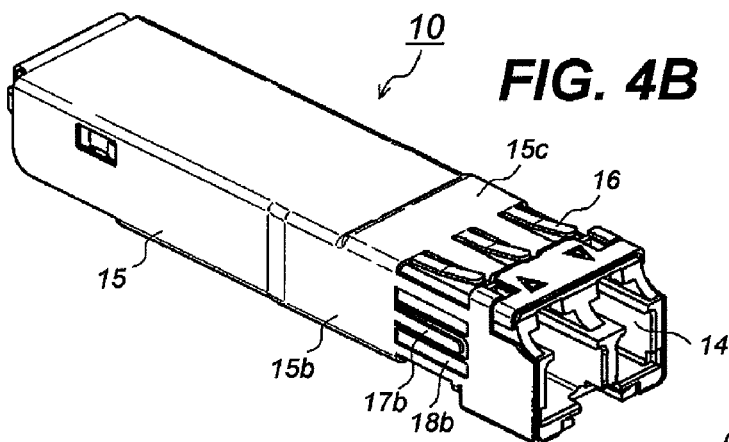
FIG. 4B
FIG. 4C
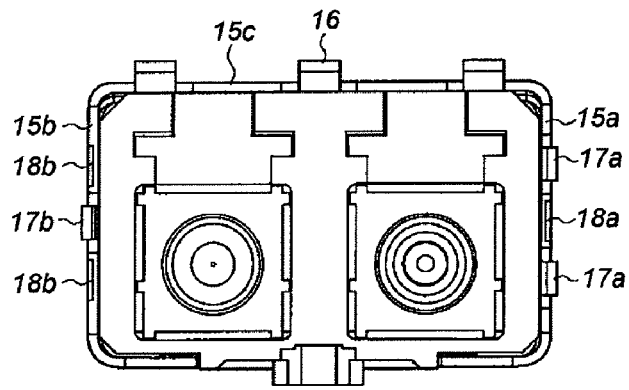
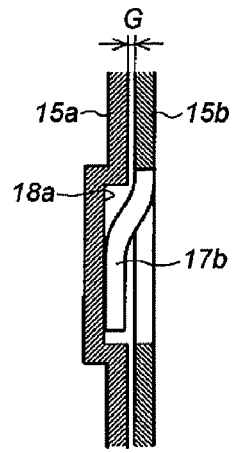
FIG. 4D

PLUGGABLE OPTICAL TRANSCEIVER CLOSELY SET WITHIN A JOINED CAGE

BACKGROUND OF THE INVENTION

1. Field of the Invention

The present invention relates to an arrangement of a pluggable optical transceiver able to be closely set within a joined cage of the host system.

2. Related Prior Art

A pluggable optical transceiver, that provides a light-transmitting device and a light-receiving device, transmits or receives optical signals through an optical connector. A pluggable transceiver typically comprises an optical receptacle that receives the optical connector and a body that encloses the light-transmitting device, the light-receiving device, electronic components, a circuit board, and so on. Such a pluggable transceiver is set within a metal cage provided in the host system to communicate with the host system.

The pluggable transceiver in the metal cover thereof usually comes in electrically contact with the metal cage and the front panel of the host system to suppress the electromagnetic interference (EMI) radiation and to enhance the heat dissipation from the transceiver to the host system. The U.S. Pat. No. 6,335,869, has disclosed an optical transceiver with a metal cover. This metal cover provides in the front end portion thereof a finger elastically protruding outwardly and, when the transceiver is set within the cage, this finger comes in contact with the edge of the opening of the face panel, through which the transceiver is set, to enhance the shielding function.

The Japanese Patent Application, published as JP-2007-233261A, has disclosed another technique to enhance the shielding function, in which the elastic finger provided in the metal cover of the transceiver protrudes from the metal cover to come in contact with the cage when the optical receptacle of the transceiver receives the optical connector to secure the smooth extraction of the transceiver from the cage. The U.S. Pat. No. 6,724,641 and U.S. Pat. No. 6,824,429, have disclosed a system where a plurality of pluggable transceivers are set within a joined cage.

FIG. 7 exemplarily illustrates a conventional pluggable transceiver 1 that comprises an optical receptacle 2 in a front side to receive the optical connector, a body subsequent to the optical receptacle 2 and a metal cover 3 enclosing the body. The cover 3 provides a plurality of top fingers 4 in the front end close to the optical receptacle, and another fingers, 5a and 5b, in respective sides, 3a and 3b. When the transceiver 1 is set within the cage, these top fingers 4 and side fingers, 5a and 5b, come in contact with an inner surface of the metal cage to secure the electrical contact therebetween not only to stabilize the ground potential but to enhance the EMI shielding function.

In order to enhance the EMI shielding function of the electronic equipment; the gap exposing the inside of the equipment should be narrow as possible. This mechanism commonly applicable for a case when a single transceiver is set within a single cage and for a case where a plurality of transceivers is set within a cage with partition walls between the set transceivers. Individual transceiver comes in electrically contact with the cage and the partition wall by the fingers protruding from the transceiver, such as those disclosed in U.S. Pat. No. 6,724,641.

Continuous request has arisen to make the electronic equipment compact and less power consumption. The host system for the optical communication is also necessary to downsize without degrading the EMI shielding function. The conventional arrangement, where the single cage is for the single transceiver, seems to have a limitation for the downsizing of the system.

Moreover, recent optical communication further increases the transmission speed thereof not only the increase of the mass of data to be transmitted. A relatively broader opening in the face panel of the host system, that is, the face panel shows a slightly wider gap with respect to the transceiver, may suppress the EMI radiation through the opening. However, a slight gap of the front panel may leak the EMI radiation in high frequencies. Accordingly, the host system and the pluggable transceiver are necessary to have the configuration where the gap between the transceiver and the opening of the front panel is small as possible, even when the multiple transceivers are set within the single cage without any center partition between the set transceivers.

SUMMARY OF THE INVENTION

The present invention relates to a pluggable optical transceiver set in a cage provided in the host system. The transceiver of the present invention comprises a metal cover having a plurality of elastic fingers coming in contact with the cage when the transceiver is set in the cage. The fingers are provided at least a left side and a right side of the transceiver. The feature of the transceiver according to the present invention is that the fingers in the left and right sides of the transceiver are formed so as not to interfere with respect each other when the transceiver and another transceiver with a same arrangement of the fingers are set in side-by-side arrangement in the cage.

The finger in the left side and the finger in the right side may be formed in a different level to each other. The finger in the left side may have a forked end shape and the finger in the right side may have a slimed end so as to pass between the forked ends of the left finger in the other transceiver. The finger in the left side may have a slimed end with an offset from a center thereof downwardly and the finer in the right side may have a slimed end with an offset from a center thereof upwardly. Moreover, a portion of the side of the transceiver where the finger in the next transceiver comes in contact thereto may have a hollow to narrower the space between the transceivers.

BRIEF DESCRIPTION OF DRAWINGS

FIGS. 4A and 4B illustrate another pluggable transceiver with another embodiment of the finger and the hollow, FIG. 4C is a front view, and FIG. 4D is a cross sectional structure of the finger and the hollow according to the second embodiment of the invention;

DESCRIPTION OF PREFERRED EMBODIMENTS

Figure 1A:
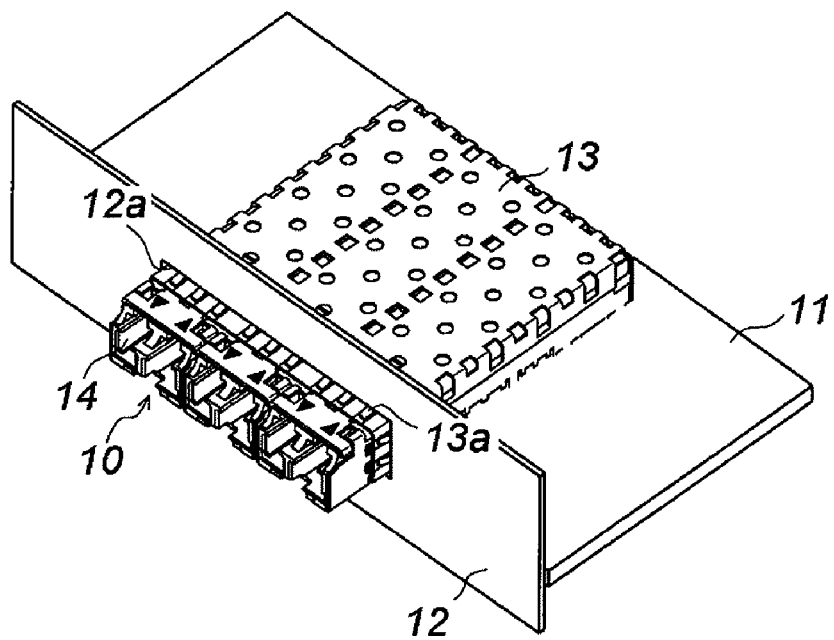
FIG. 1A is a perspective view of three optical transceivers set within a cage.

Next, preferred embodiments according to the present invention will be described as referring to accompanying drawings. FIG. 1A is a perspective view of optical transceivers, three (3) transceiver are appeared in FIG. 1A, are set within a joined cage, while, FIG. 1B is a front view of the assembly including three transceivers and the joined cage.

On the host system is provided with a host board 11 that mounts the joined cage 13. The front side of the host board provides the panel 12 with an opening 12a from which the front end of the joined cage exposes. The cage has a box shape made of metal sheet and provides a plurality of elastic fingers 13a in the front end thereof. These elastic fingers 13a come in contact with the inner edge of the opening to secure and to stabilize the ground potential for the cage. The joined cage 13 in a body portion thereof is grounded on the host board 11 to shield the optical transceiver 10 set therein.

Figure 1B:
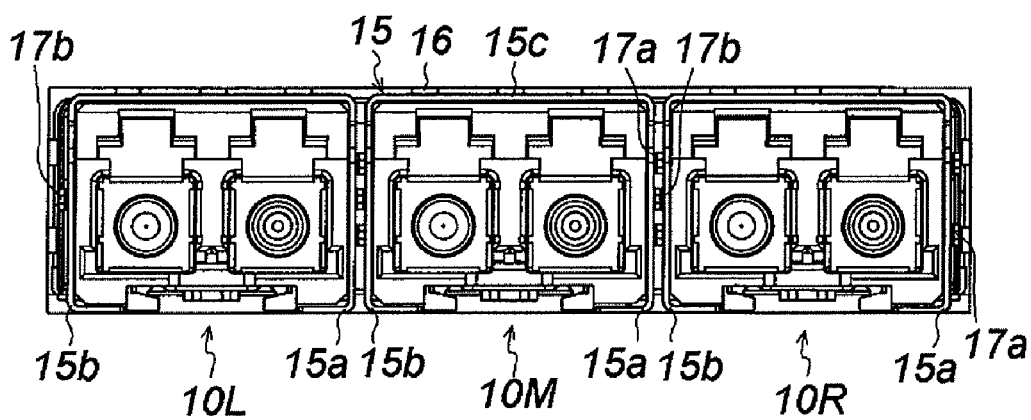
FIG. 1B is a front view of the assembly including three transceivers and the cage.

As illustrated in FIGS. 1A and 1B, the joined cage receives three optical transceivers, 10L, 10M and 10R, without any partitions between the transceivers. The optical transceivers, 10R, each provide an optical receptacle 14 that receives an external optical connector therein and a body portion that encloses optical devices, electronics components and electronic circuits. This body portion is covered with a metal cover 15 made of metal sheet.

This metal cover, as illustrated in FIG. 1B, provides a plurality of elastic fingers in the top 15c and both sides, 15a and 15b, thereof. The top finger 16 abuts against the inner wall of the cage 13, while, fingers, 15a and 15b, in both sides are configured such that, when two optical transceivers are set within the joined cage side by side, one of the side fingers 17a does not interfere the other finger 17b provided in the side of the next transceiver.

The transceiver 10R set in the right end of the joined cage 14 abuts in the side finer 17a thereof against the right wall of the joined cage 13, while, the other transceiver 10L set in the left end abuts in the left finger 17b thereof against the left wall of the cage 13.

Figure 2A:
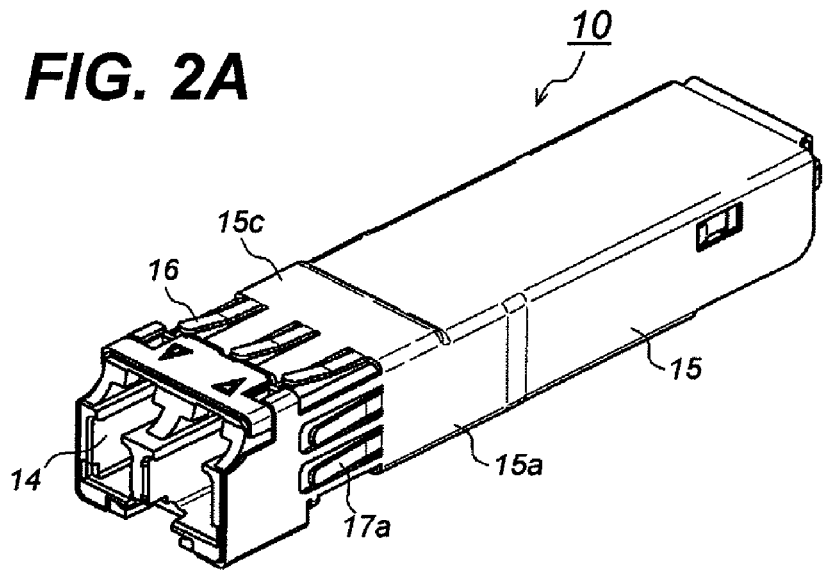
FIGS. 2A and 2B are external appearances of the optical transceiver 10 according to an embodiment of the invention, and, FIG. 2C is a front view of the transceiver 10.
Figure 2B:
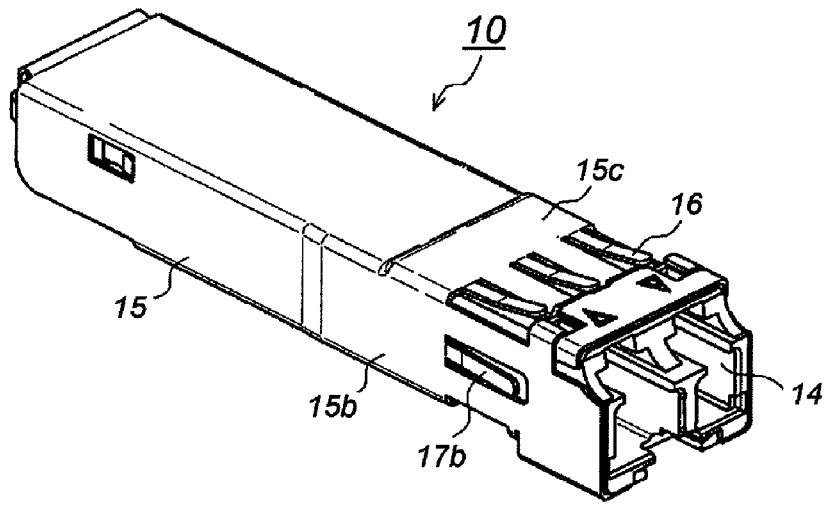
Figure 2C:
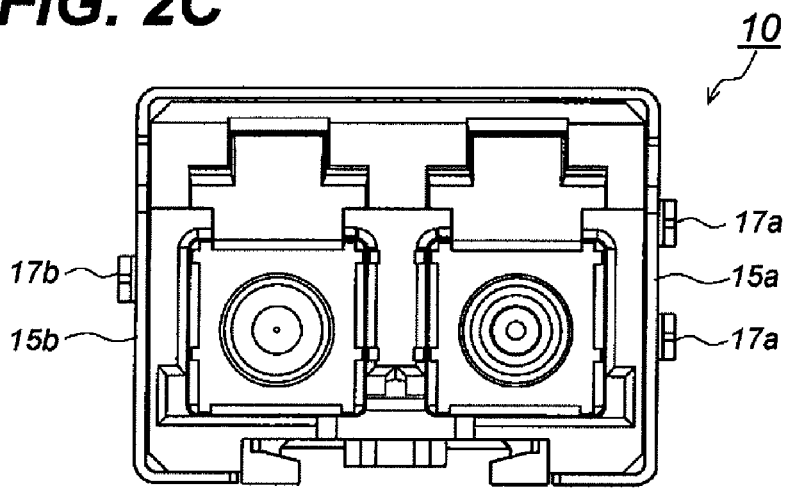

The rest transceiver 10M set between two transceivers, 10L and 10M, in the finger 17a provided in the right wall 15a thereof comes in contact with the left wall 15b of the next transceiver 10R, while, the left finger 17b of the left transceiver 10L comes in contact with the right wall 15a of the middle transceiver 10M. Similar finger arrangements between the middle and the left transceiver, 10M and 10L, are configured to secure the electrical contact FIGS. 2A and 2B are external appearances of the optical transceiver 10 according to an embodiment of the invention, while, FIG. 2C is a front view of the transceiver 10. As described, the optical transceiver comprises the optical receptacle 14 in the front side and the body portion subsequent to the optical receptacle 14, in which the semiconductor optical devices, the electronic devices, the circuits and so on are implemented. This body portion is covered with the metal cover 15.

The metal cover 15, which is formed by punching the metal sheet, provides the finger 16 in the front end, just behind the optical receptacle 14. The finger 16 is formed by slitting the metal sheet with a U-shape and by bending the inner portion of this U-shape outwardly. The transceiver 10 may also provide the bottom finger in the front end of the bottom thereof. Two sides of the transceiver 10 also have at least a finger formed by the method similar to those above mentioned. Side fingers may have the same shape with that of the top or the bottom finger, but the shape thereof is optional.

However, the side fingers, 17a and 17b, are necessary to distinguish the levels thereof not to interfere the other finger of the next transceiver, as described above. FIGS. 2A and 2B show an exemplary configuration of side fingers, that is, the right wall 15a has two fingers 17a with a space therebetween, while, the left wall 15b provides the single finger 17b whose level corresponds to the space formed between two fingers 17a in the right wall 15a.

FIG. 2C is a front view of the transceiver 10 whose side fingers are so provides as described above. The right side 15a has two fingers 17a with the space therebetween, while, the left side 15b provides the signal finger 17b whose level is just between the two fingers 17a in the right side 15a. Thus, even when two transceivers are set within the joined cage in side by side, side fingers provided in both transceivers do not interfere with each other.

Figure 3A:
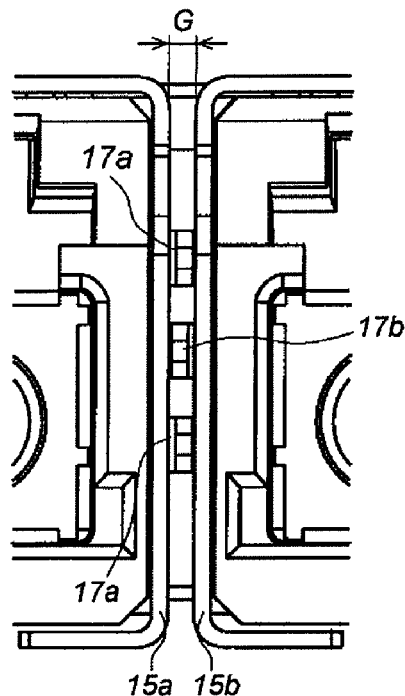
FIG. 3A magnifies a gap between two transceivers each set within the single cage in side-by-side arrangement.
Figure 3B:
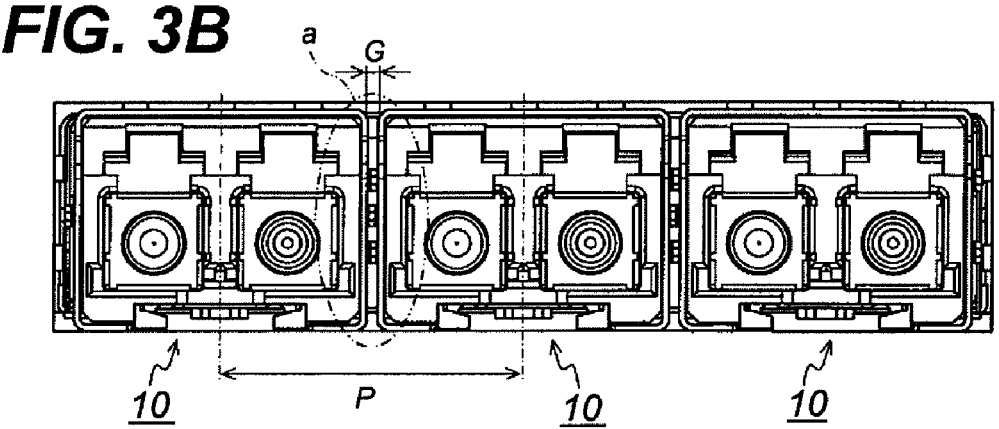
FIG. 3B is a front view when three transceivers, each has the finger configuration of the present invention.
Figure 3C:
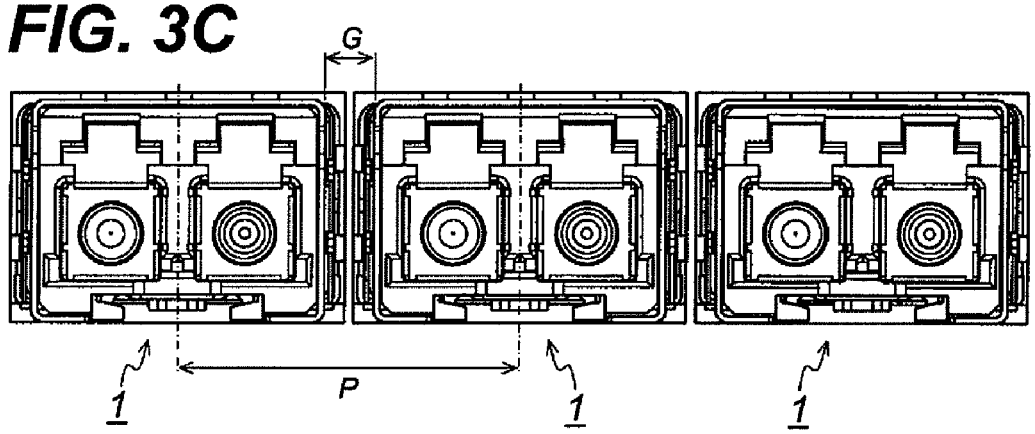
FIG. 3C is another front view when three transceivers are individually set in a distinct cage.

FIG. 3A magnifies a gap between two transceivers each set within the joined cage in side-by-side arrangement, FIG. 3B is a front view when three transceivers, each has the finger configuration mentioned above according to the present invention, while FIG. 3C is another front view when three transceivers are individually set in a distinct cage, where the these transceiver have the conventional configuration of the side finger.

When two transceivers are set in the cage, as illustrated in the magnified view of FIG. 3A, the right finger 17a of the transceiver set in the left comes in contact with the left wall 15b of the other transceiver set in the right, while, the left finger 17b of the transceiver set in the right comes in contact with the right wall of the transceiver set in the left. Thus, a secure electrical contact between two transceivers is realized. Moreover, the gap G between two transceivers may be narrowed to about a thickness of the metal cover 15.

Arraying the transceivers 10 of the present invention in horizontal, as illustrated in FIG. 3B, the pitch P between the transceivers 10 may become about 14 mm. On the other hand, arranging the conventional transceiver 1 whose width is comparable with that of the transceiver 10 of the invention, the pitch between the transceivers 1 exceeds 16 mm because the transceiver configures the fingers in the same level in both sides and requires the individual cage. According to the finger configuration of the present transceiver 10, when a plural transceiver is arrayed in the joined cage, not only the pitch P may be reduced to make the host system compact, but the gap G between the transceivers may be narrowed to enhance the EMI shielding function.

FIGS. 4A to 4D illustrate another arrangement of the side fingers according to an embodiment of the invention. This embodiment has the same finger configuration with that of the first embodiment shown in FIGS. 3A to 3C. That is, the left finger 17a and the right finger 17b have different levels with respect to each other such that, when the transceiver 10 is set in the cage, the right finger 17a does not interfere the left finger of the next transceiver, and the left finger 17b of the next transceiver does not interfere the right finger 17a of the present transceiver. However, the transceiver 10 of FIGS. 4A to 4C has a different configuration in a portion where the fingers of the next transceiver come in contact.

That is, the portion in the left side 15*b* where the side finger 17*a* of the next transceiver comes in contact therewith forms a hollow 18*b*, while, the portion in the right side 15*a*, the side finger 17*b* of the next transceiver abuts against thereto, provides another hollow 18*a*. FIG. 4C illustrates a front view of the transceiver 10 with the configuration described hereto. The right side 15*a* provides two fingers 17*a* and the hollow 18*a* between the fingers 17*a*, while, the left side 15*b* provides the single finger 17*b* in the middle thereof and two hollows 18*b* put the finger 17*b* therebetween.

Arraying the transceiver 10 illustrated in FIGS. 4A to 4C, the side finger, the left finger 17*b* in FIG. 4D, comes in contact with the side 15*a* of the next transceiver as setting within the hollow 18*a*. Although not shown in the figure, the right finger 17*a* comes in contact with the left wall of the next transceiver as setting within the hollow of the right side of the next transceiver.

According to the finger configuration and the hollow in the side of the transceiver illustrated in FIGS. 4A to 4D, the pitch between transceivers maybe further reduced to about 13.7 mm when the transceivers with such configuration are set within the cage in side-by-side.

FIGS. from 5A to 6C illustrate still another finger configuration and the configuration of the side wall of the transceiver to realize the close side-by-side relation between transceivers set within the joined cage. Although the finger configuration shown in FIGS. 5 and 6 have the same level in both sides of the transceiver, the side fingers have a shape not to interfere the finger of the next transceiver even when the right side 15*a* of the present transceiver closely faces the left side 15*b* of the next transceiver.

Figure 5A:
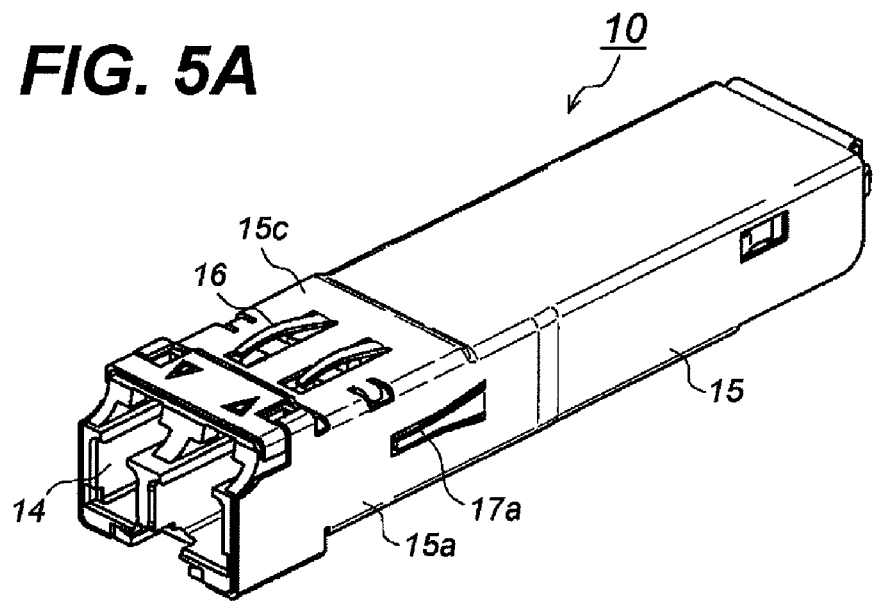
FIGS. 5A and 5B illustrate still another transceiver with the third embodiment of the finger arrangement of the present invention, and FIG. 5C magnifies the side-by-side arrangement of the transceivers with the finger of the third embodiment.
Figure 5B:
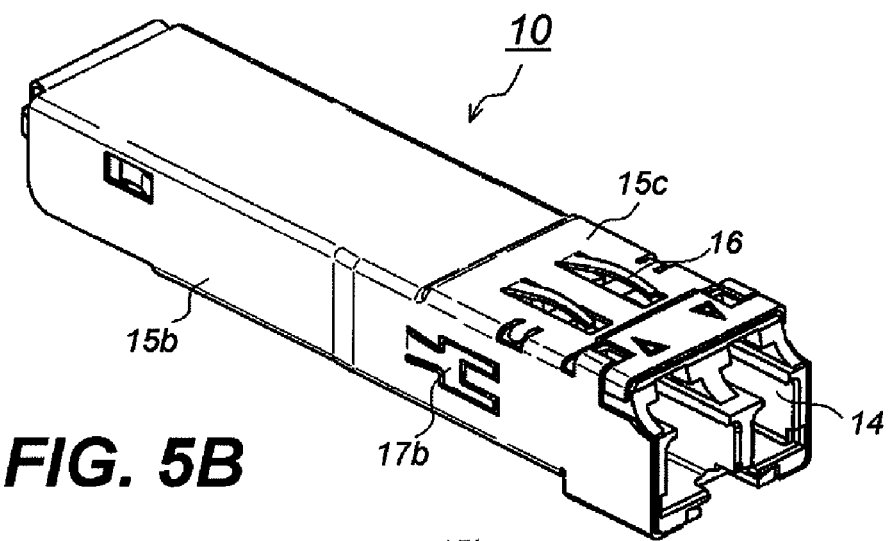
Figure 5C:
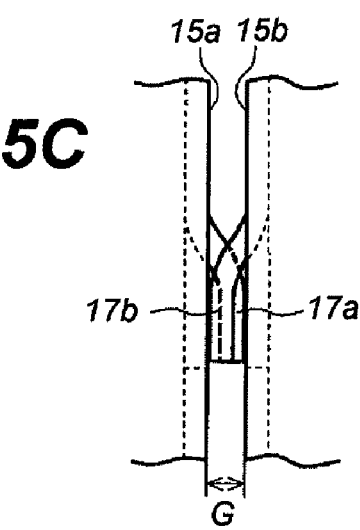

Specifically, in the configuration shown in FIGS. 5A to 5C, the left finger 17*b* provides a forked shape in the tip end thereof, while, the right finger 17*a* has a width in a tip end thereof able to be set between the gap of the forked shape. That is, the right finger 17*a* and the left finger 17*b* have the nested relation in the shapes thereof.

Setting two transceivers in close side-by-side arrangement, the left finger 17*b* of the present transceiver comes in contact with the right side 15*a* of the next transceiver, while, the right finger 17*a* of the next transceiver comes in contact with the left side 15*b* of the present transceiver passing through the gap between the forked shape. In this finger configuration, the gap G between the transceivers, when they are arrayed in the side-by-side arrangement, may be reduced.

Figure 6A:
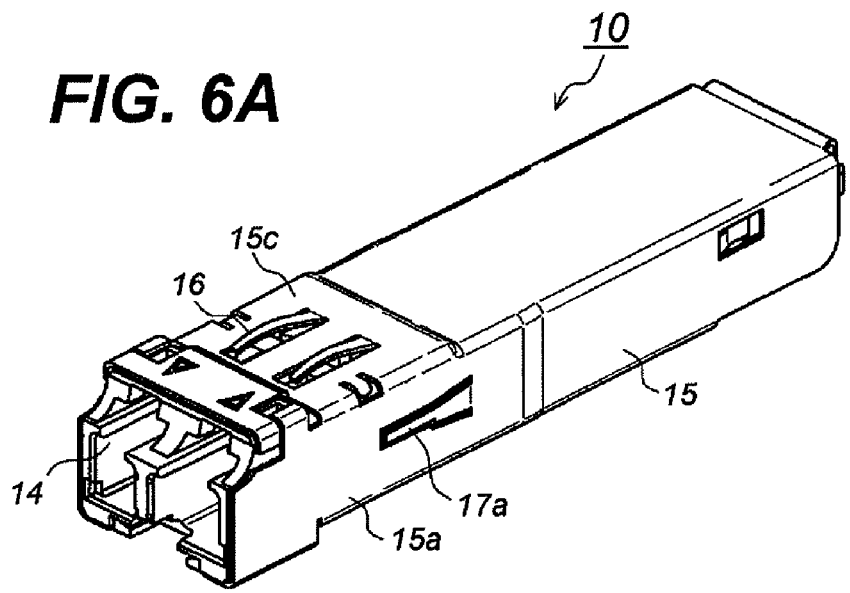
FIGS. 6A and 6B illustrate still another transceiver with the fourth embodiment of the finger arrangement of the present invention, and FIG. 6C magnifies the side-by-side arrangement of the transceivers with the finger of the third embodiment.
Figure 6B:
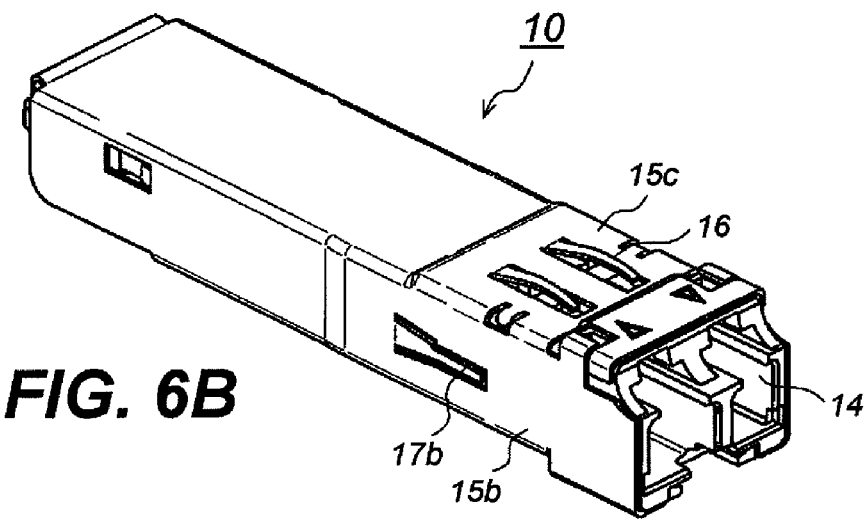
Figure 6C:
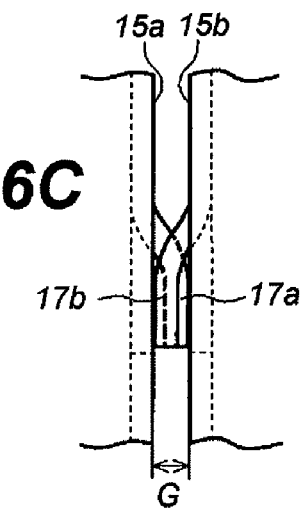
Figure 7A:
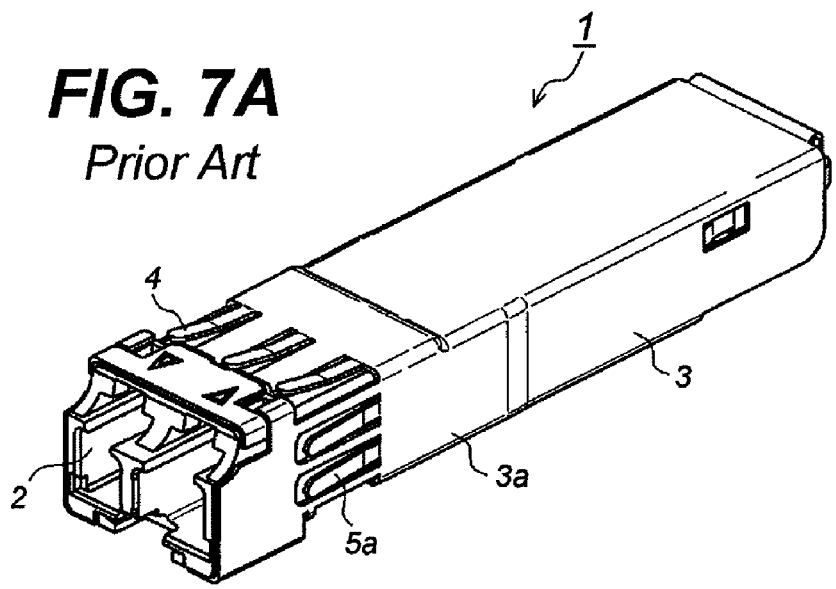
FIG. 7 illustrates a pluggable transceiver 1 with a conventional arrangement of the ground finger.
Figure 7B:
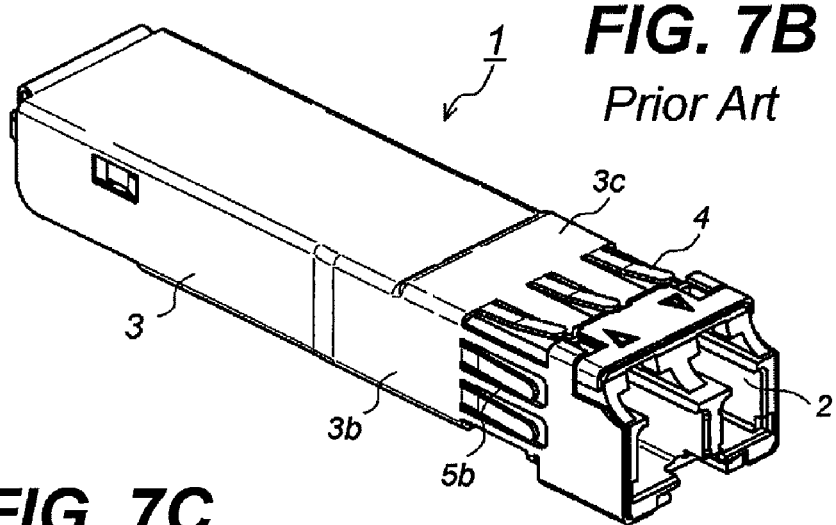
Figure 7C:
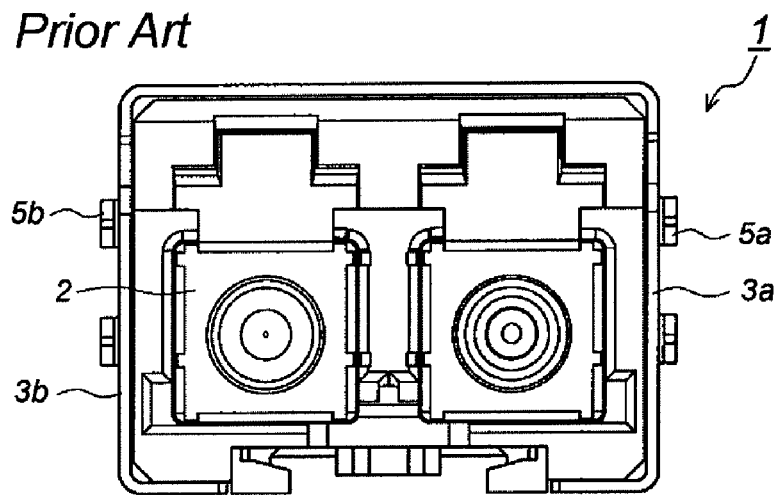

Another finger configuration according to the present embodiment is illustrated in FIGS. 6A to 6C. In the embodiment, the left finger 17*b* provides an end portion offset from the center thereof downwardly and with a width less than a half of the full width, while, the right finger 17*a* thereof provides an end portion offset from the center upwardly and with a width less than a half of the full width. That is, the end portion of the right finger 17*a* and that of the left finger 17*b* makes an alternate relation.

Setting two transceivers each having the finger illustrated in FIG. 6 in close side-by-side arrangement, the right finger 17*a* in the one transceiver may come in contact with the left side of the other transceiver, and the left finger 17*b* of the other transceiver in the end portion thereof may come in contact with the left wall of the present transceiver by bypassing the end of the right finger 17*a* of the next transceiver.

Thus, although the side fingers, 17*a* and 17*b*, are provided in respective sides of the transceiver in a substantially same level; the end portion of the fingers do not interfere with respect to each other. Accordingly, a plural transceiver 10 may be set within the joined cage 15 such that respective side fingers, 17*a* and 17*b*, come in contact with the side of the next transceiver to secure the electronic contact between the transceivers with a reduced pitch P and a reduced gap P. The assembly of the transceivers set within the joined cage may enhance the EMI shielding function.

While the preferred embodiments of the present invention have been described in detail above, many changes to these embodiments may be made without departing from the true scope and teachings of the present invention. The present invention, therefore, is limited only as claimed below and the equivalents thereof.

What is claimed is:

1. A pluggable optical transceiver set in a cage, comprising: a metal cover with a plurality of elastic fingers coming in contact with said cage when said transceiver is set in said cage, said fingers being provided at least a left side and a right side of said transceiver,
wherein said fingers in said left side and in said right side are formed so as not to interfere with respect to each other when said transceiver and another transceiver having a same arrangement of said fingers are set in side-by-side arrangement within said cage.

2. The pluggable optical transceiver according to claim 1, wherein said finger provided in said left side and said finger provided in said right side are formed in a different level to each other.

3. The pluggable optical transceiver according to claim 2, wherein said right side of said transceiver provides a hollow in a position where a finger in a left side of said other transceiver comes in contact.

4. The pluggable optical transceiver according to claim 1, wherein said finger in said left side has a forked end shape and said finger in said right side has a slimed end so as to pass between said forked ends.

5. The pluggable optical transceiver according to claim 4, wherein said right side of said transceiver provides a hollow in a position where a finger in a left side of said other transceiver comes in contact.

6. The pluggable optical transceiver according to claim 1, wherein said finger in said left side has a slimed end offset from a center thereof downwardly and said finger in said right side has a slimed end offset from a center thereof upwardly.

7. The pluggable optical transceiver according to claim 6, wherein said right side of said transceiver provides a hollow in a position where a finger in a left side of said other transceiver comes in contact.

* * * * *